(12) United States Patent
Walke (10) Patent No.: US 7,490,886 B1
(45) Date of Patent: Feb. 17, 2009

(54) CONSOLE STORAGE HOUSING FOR USE IN A SPORTS TYPE AUTOMOBILE

(76) Inventor: Gary L. Walke, 805 9th Ct., Bondurant, IA (US) 50035

( * ) Notice: Subject to any disclaimer, the term of this patent is extended or adjusted under 35 U.S.C. 154(b) by 308 days.

(21) Appl. No.: 11/294,166

(22) Filed: Dec. 5, 2005

Related U.S. Application Data (60) Provisional application No. 60/641,931, filed on Jan. 6, 2005.

(51) Int. Cl.
*B60N 3/12* (2006.01)
(52) U.S. Cl. .................................................... 296/37.8
(58) Field of Classification Search ............... 296/37.7, 296/37.1, 37.8, 24.34, 1.07; 248/311.2, 309.1; 224/926
See application file for complete search history.

(56) References Cited

U.S. PATENT DOCUMENTS

| | | | | |
|---|---|---|---|---|
| 1,327,223 A * | 1/1920 | Boyle | ................. | 224/42.39 |
| 2,897,974 A * | 8/1959 | Cook | .................... | 211/74 |
| 2,963,256 A | 12/1960 | Borah | | |
| 3,163,287 A | 12/1964 | Barnett | | |
| 3,356,409 A * | 12/1967 | Belsky et al. | ............ | 296/24.34 |
| 4,341,304 A * | 7/1982 | Diller | ..................... | 206/349 |
| D268,072 S | 3/1983 | Boggs | | |
| 4,613,048 A * | 9/1986 | McGill | ................... | 224/400 |
| 4,728,018 A * | 3/1988 | Parker | ..................... | 224/544 |
| 4,798,360 A * | 1/1989 | Alter | ....................... | 248/311.2 |
| 4,854,468 A * | 8/1989 | Dahlquist, II et al. | ....... | 220/737 |
| 5,022,549 A * | 6/1991 | Beaver | .................... | 220/739 |
| 5,174,534 A * | 12/1992 | Mitchell | ................... | 248/311.2 |
| 5,289,962 A * | 3/1994 | Tull et al. | ................... | 224/549 |
| 6,123,307 A | 9/2000 | Bain | | |
| 6,170,725 B1 | 1/2001 | Ganues | | |
| 6,203,088 B1 * | 3/2001 | Fernandez et al. | ......... | 296/37.8 |
| 6,899,309 B2 * | 5/2005 | Smith | ....................... | 248/311.2 |
| 7,029,048 B1 * | 4/2006 | Hicks et al. | ............... | 296/24.34 |
| 7,147,192 B2 * | 12/2006 | Kong | ....................... | 248/311.2 |
| 7,168,669 B2 * | 1/2007 | Park | ......................... | 248/311.2 |
| 2007/0138819 A1 * | 6/2007 | Akimoto et al. | ............ | 296/37.8 |
| 2007/0182183 A1 * | 8/2007 | Lota | ......................... | 296/24.34 |

* cited by examiner

*Primary Examiner*—H Gutman
(74) *Attorney, Agent, or Firm*—Sturm & Fix LLP (57) ABSTRACT

A console storage housing for use in a sports type automobile such as a late model CORVETTE produced in the model years from 1997 to 2005 and beyond (Generations C5 and C6 CORVETTE). The console includes openings for storing numerous items carried into an automobile that need convenient and secure retention (i.e. eyeglasses, cellular phones, garage door openers, coins, maps, and beverages). The attachment of the console is accomplished in such a manner to not alter the automobile's original construction. The design utilizes the existing interior component surfaces for mounting. The console emulates the surrounding interior components' surface finishes so as to seamlessly blend into the interior of the automobile.

1 Claim, 10 Drawing Sheets

CONSOLE STORAGE HOUSING FOR USE IN A SPORTS TYPE AUTOMOBILE

CROSS REFERENCE TO RELATED APPLICATIONS

This application contains disclosure from and claims the benefit under Title 35 United States Code § 119(e) of U.S. Provisional application Ser. No. 60/641,931, filed Jan. 6, 2005 and entitled "Console Storage Housing for Use in a Sports Type Automobile" and is incorporated by reference herein in its entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This invention relates to automotive storage. More particularly, the invention is directed to the field of a console storage housing (console) for automobiles, particularly late model Chevrolet CORVETTES, a trademark of the General Motors Corporation or any sports type automobiles in which the occupants desire to utilize the additional storage facilitated by an auxiliary console without compromising the aesthetics of the automobile.

2. Description of Related Art

The present invention relates particularly to a console for a late model Chevrolet (GM) CORVETTE, such as for the years 1997 to 2005 and beyond (generations C5 and C6 CORVETTE), where the console is mounted between the seats of the automobile, facing forward, adjacent to the driver and/or passenger. However, the console of the present invention may be used in any automobile with a similar seat, bulkhead, existing console, and space arrangement as the above mentioned models of CORVETTE.

The prior art is replete with various references for conveniently mounting storage devices or containers where the receptacle is typically positioned in the front dashboard, on the floor, on the door, or attached to the center console. The prior art also discloses utilizing two or more pieced inventions for attachment to the interior components. A review of examples of such prior art is reflected in the following U.S. patents as follows:

U.S. Pat. No. 2,963,256, is directed to an article holding and gripping device. In particular a gripping device that can be mounted either temporarily or permanently to a surface in order to temporarily hold an article. The article holding device can be adjustably mounted in trains, buses, boats, airplanes, automobiles, trailers, and mobile homes. The object of the invention is for receiving and holding various sized articles.

U.S. Pat. No. 3,163,287 is directed to a tray to provide an improved holding design that can be mounted to a variety of surfaces for retention and holding of a variety of articles.

U.S. Design Pat. No. D268,072 is directed to an ornamental design for a tray for an chair arm. The design illustrated utilizes multiple pieces to make the attachment to different surfaces possible.

U.S. Pat. No. 6,123,307 is directed to a center console housing a cup holder. The housing and cup holder are separate pieces for means of closing the cup holder compartments for storage. The cup holder further is designed with three separate, generally cylindrical cup holding compartments. The three compartments are arranged in a variety of nonlinear fashions to take advantage of the space available. The cup holder is designed to accommodate up to three beverage containers.

U.S. Pat. No. 6,170,725 is directed to a tissue dispenser assembly for a late model CORVETTE such as for the model years 1997 to 1999. The two-piece assembly includes a box-like housing for slide-ably receiving a conventional box of facial tissue, and a support adapter secured to at least a portion of the housing. The housing and adapter are positioned to lie contiguous with a pair of angled walls forming a part of the console of the CORVETTE.

BRIEF SUMMARY OF THE INVENTION

The invention hereof relates to a console storage housing (console) for a sports type automobile, specifically a General Motors Corporation (GM) CORVETTE model automobile. The CORVETTE includes a center console housing featuring a gear shifting mechanism, a center glove compartment and door assembly, and center console contoured housing top. The center console contoured housing top of the CORVETTE center console protrudes up to an angular structural bulkhead of the automobile. The console of the present invention comprises a contoured housing that has a plurality of openings for storage of a variety of items brought into an automobile. The contoured underside of the console is positioned to lie contiguous with the existing center console contoured housing top. The angular cutout section of the console storage housing is positioned to lie contiguous with and over the angular structural bulkhead. Finally, the contoured surfaces of the console and the existing center console contoured housing top as well as the angular cutout section of the console and angular structural bulkhead are fastened together with self adhesive tape, a hook and loop fastener, a sheet metal fastening strip that is pushed through from the underside of the interior carpet surface up into the map pocket and there secured, and/or other mechanical means to firmly attach the console to the automobile.

Accordingly, an object of this invention is to provide a stylish, complementary, and aesthetically pleasing storage housing to a late model sports type automobile such as the General Motors Corporation (GM) CORVETTE particularly for the model years 1997 to 2005 and beyond (generations C5 and C6 CORVETTE).

These and other objects will become apparent to those skilled in the art from the following description, particularly when read in conjunction with the accompanying drawings.

DETAILED DESCRIPTION OF THE INVENTION

The present invention is directed to a console storage housing (console) that is to be fastened to the existing center console and bulkhead of an appropriate automobile, especially a late model CORVETTE, and more especially a late model CORVETTE of the model years 1997 to 2005 and beyond. The console will now be described with reference to the several drawings wherein like reference numerals represent similar or identical components and features throughout the several views.

Figure 1:
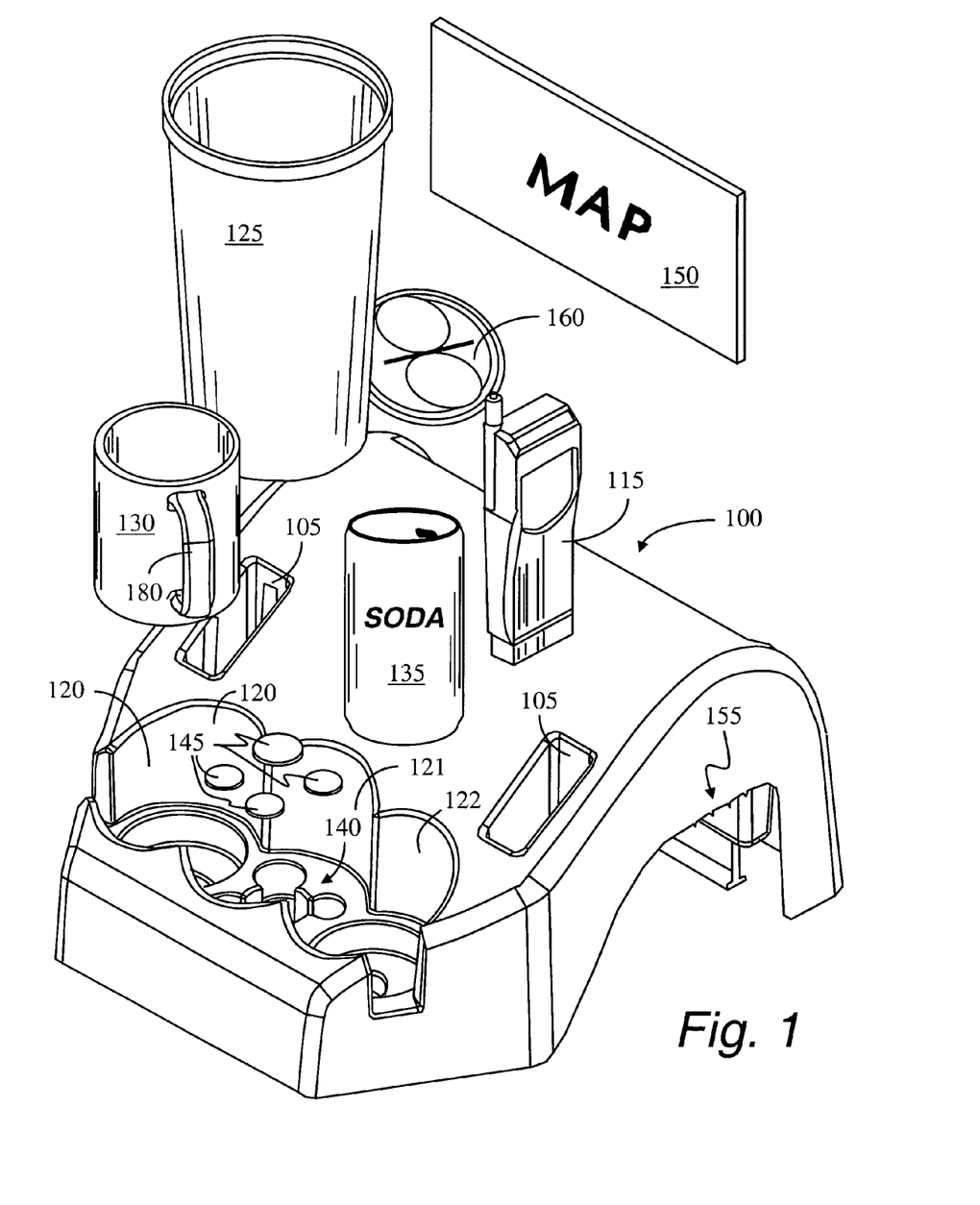
FIG. 1 is a perspective view of a console storage housing of the present invention depicting a plurality of items storable in the console storage housing including a cell phone, coffee cup, beverage can, coins, garage door or gate opener, map, eyeglasses, large drink cup, and decorative emblem.

FIG. 1 depicts the console storage housing 100 as a one piece, molded plastic housing. On the front side, compartments 105 are provided for the storage of eyeglasses (including sunglasses), cell phones 115, garage door or gate openers, pens, flashlights, etc. Cup holders 120-122 for retaining beverage cups 125, mugs 130, and soft drink cans 135 are provided closer to the front of the console storage housing 100. Within the center beverage cup holder 121, are several specialized coin compartments 140 for storage of coins 145 and/or tokens. A pocket 310 (not shown in FIG. 1, see FIG. 3) provides space for the storage of maps 150, pamphlets, owner's manuals, etc. The console storage housing 100 is provided with a shaped cutout 155 for mounting to the automobile's interior structure. An emblem 160 may be incorporated for aesthetics and advertising.

Figure 2:
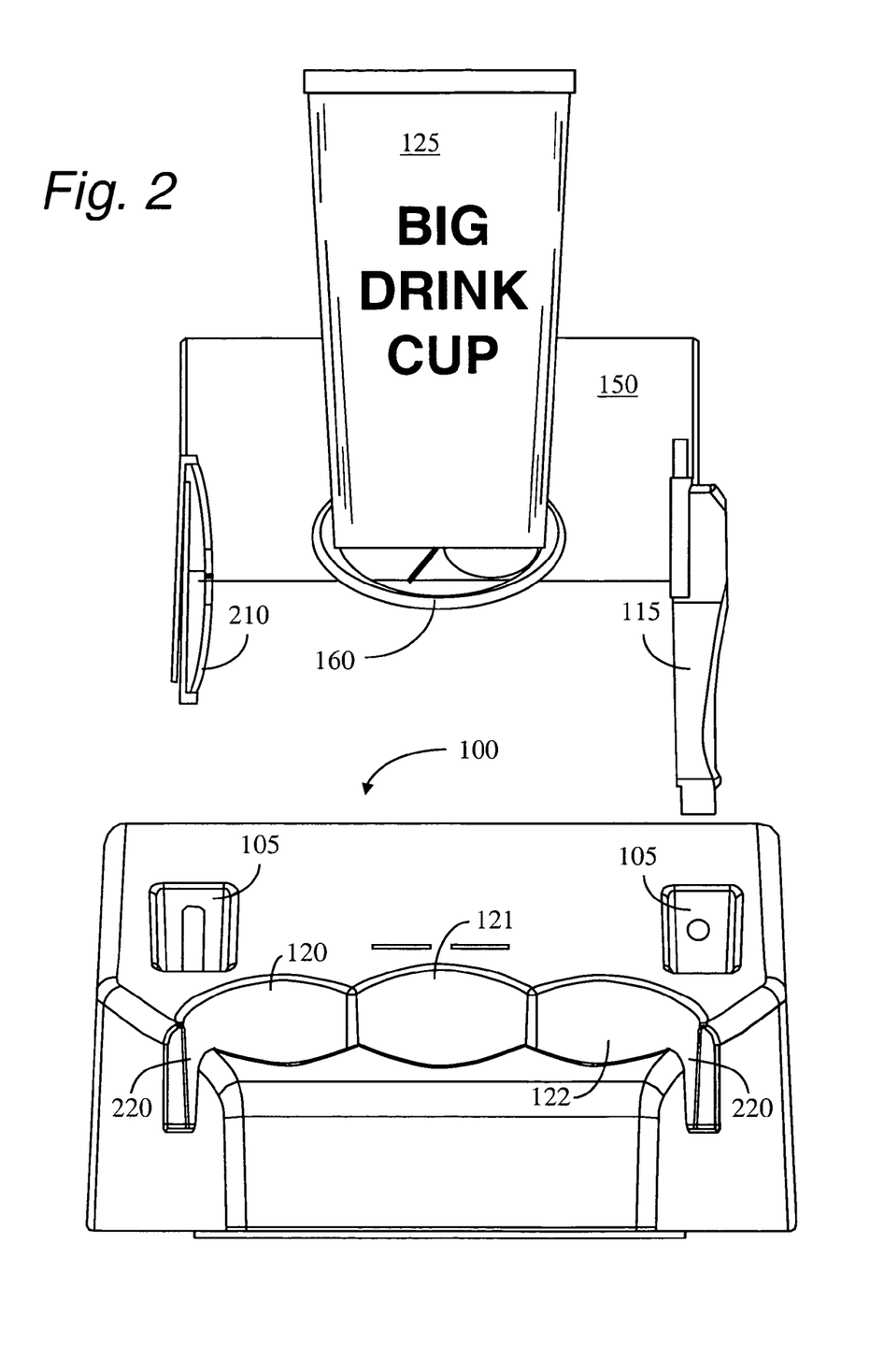
FIG. 2 is a front elevation view of the console storage housing with various storable items.

In FIG. 2, the console storage housing 100 is shown in frontal elevation along with the beverage cup 125, eyeglasses 210, such as sunglasses, the cell phone 115, the map 150, and the emblem 160. The three cup holders 120-122 may be seen toward the front of the console storage housing 100, with the center cup holder 121 being larger than the outside cup holders 120, 122. The outside cup holders 120, 122 may include cutouts 220 providing space for mug handles 180 (see FIG. 1).

Figure 3:
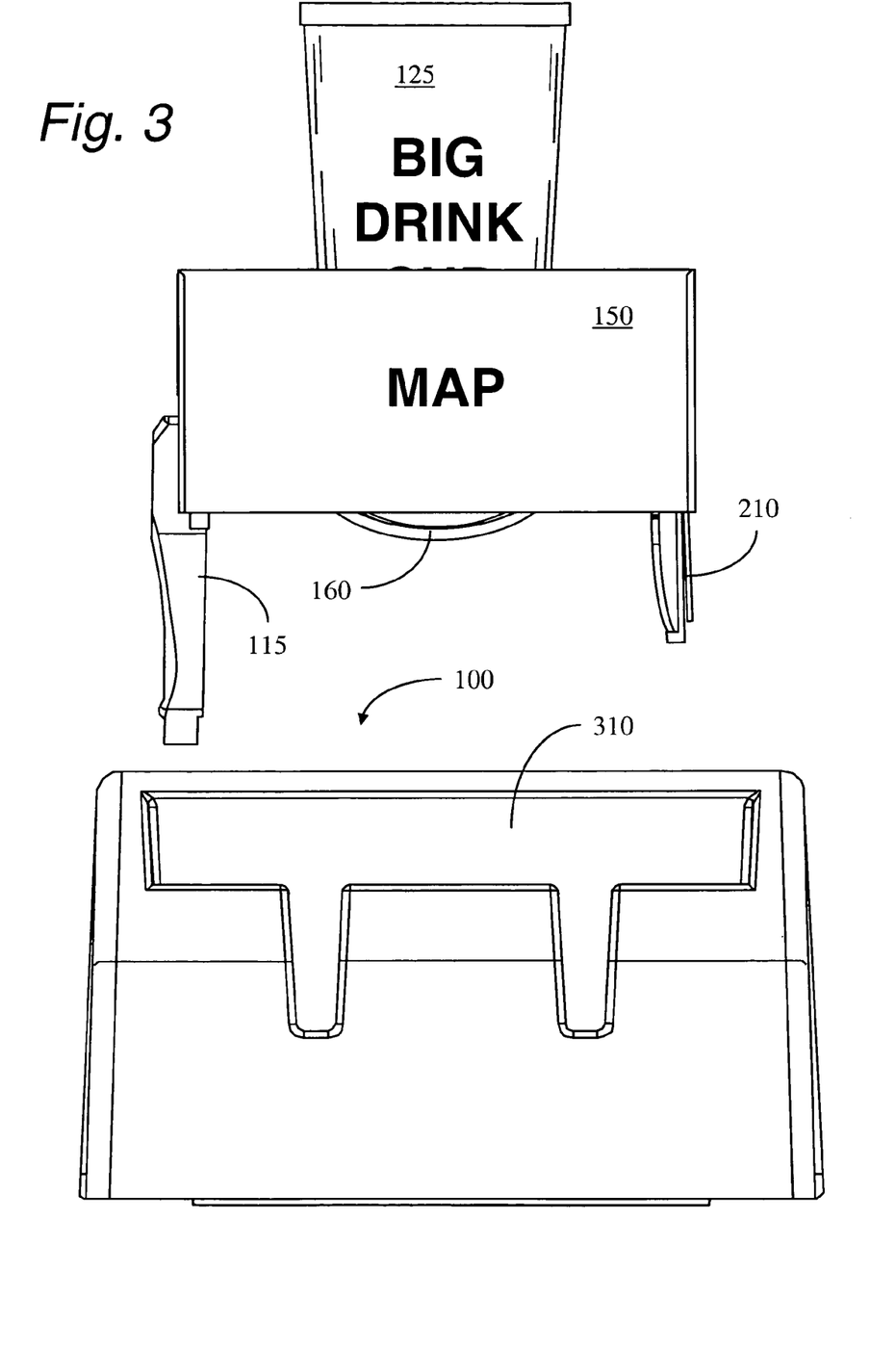
FIG. 3 is a rear elevation view of the console storage housing with various storable items.

FIG. 3 is a rear elevation view of the console storage housing 100, along with the beverage cup 125, eyeglasses 210, the cell phone 115, the map 150, and the emblem 160. In this view, the pocket 310 for maps 150, brochures, owners' manuals, etc. is clearly shown.

Figure 4:
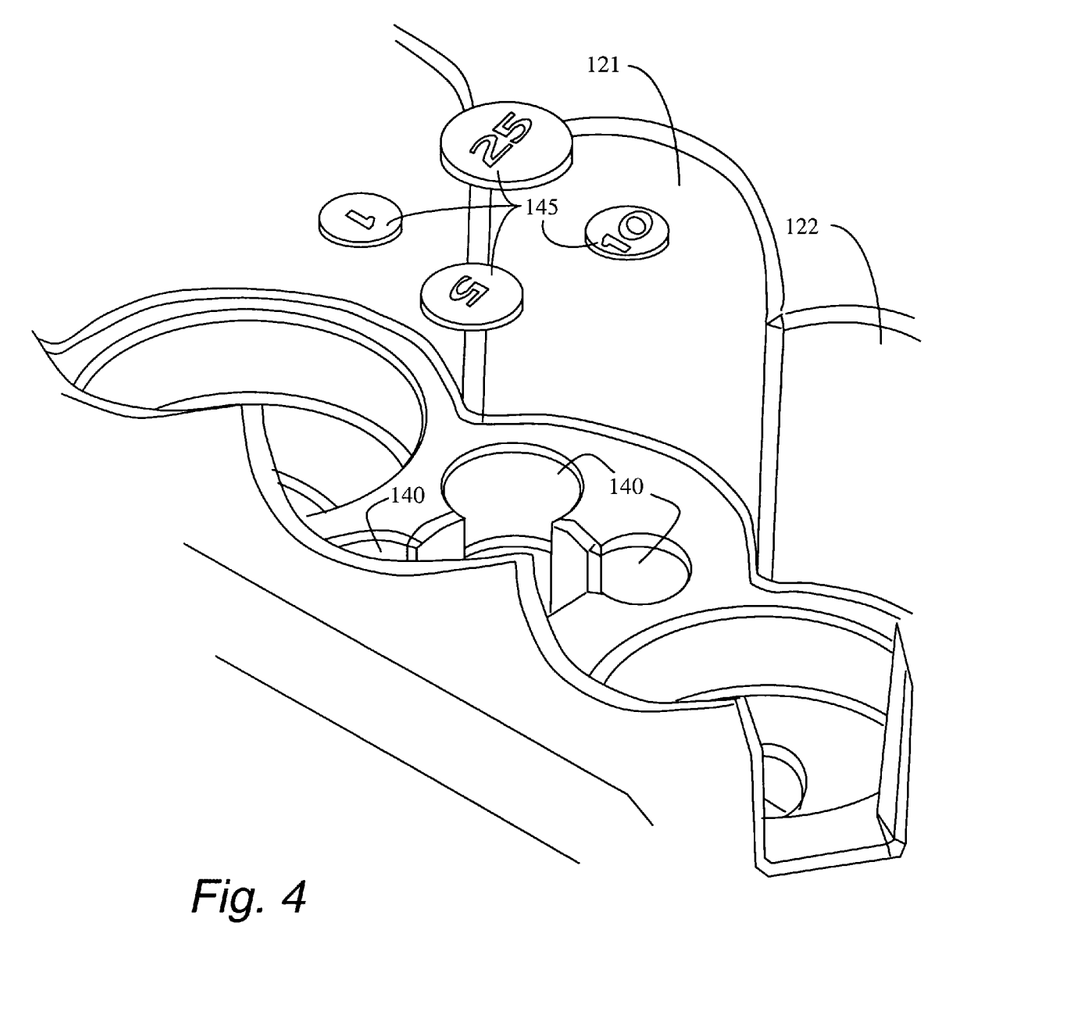
FIG. 4 is a detail view showing coins and coin storage in the bottom of a cup holder.
Figure 17:
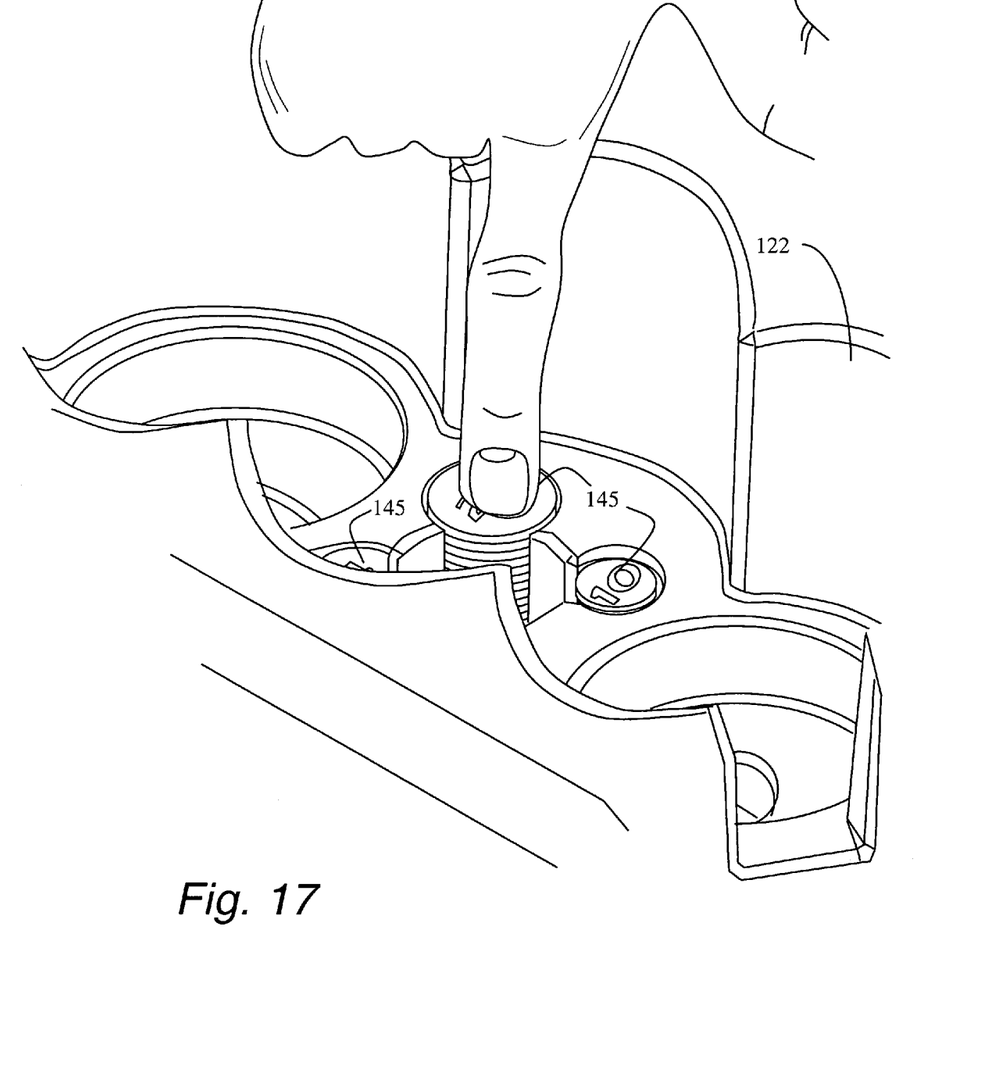
FIG. 17 is a detail view showing coins and coin storage in the bottom of a cup holder and a user accessing the coins.

The specialized coin compartments 140 for storage of various sizes of coins 145 and/or tokens are shown in FIG. 4. These specialized coin compartments 140 reside at the base of the center cup holder 121 and may be accessed by a user by inserting a finger into the center cup holder 121 to remove coins 145 from each respective coin compartment 140 as illustrated in FIG. 17.

Figure 5:
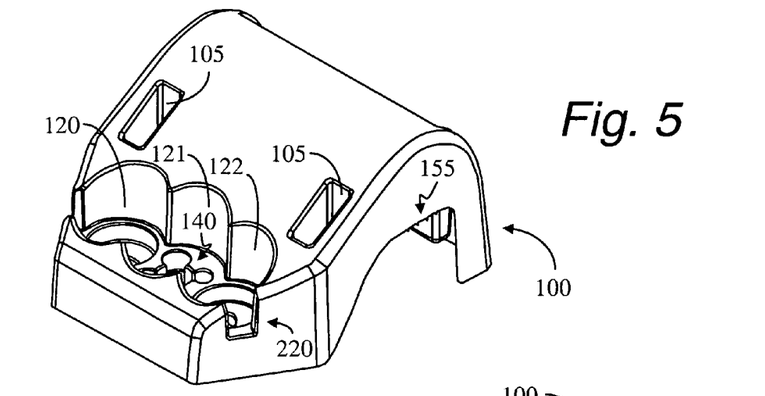
FIG. 5 is a perspective view of the console storage housing, depicting the general contoured shape and plurality of openings in the housing.

FIG. 5 is a perspective view of the console storage housing 100, this time with no stored items included. Again, compartments 105 are provided for the storage of eyeglasses 210, cell phones 115, garage door openers, pens, flashlights, etc. Cup holders 120-122 for retaining beverage cups 125, mugs 130, and soft drink cans 135 are provided closer to the front of the console storage housing 100. At the base of the center beverage cup holder 121 are several specialized coin compartments 140 for storage of coins 145 and/or tokens. The console storage housing 100 is provided with a shaped cutout 155 for mounting to the automobile's interior structure.

Figure 6:
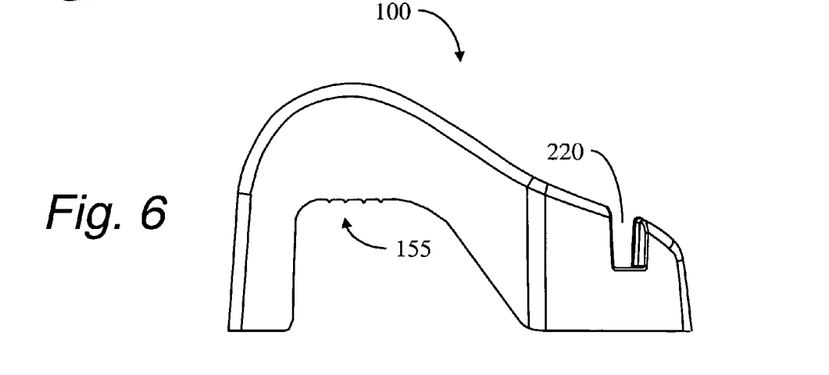
FIG. 6 is a first side elevation view of the console storage housing.
Figure 7:
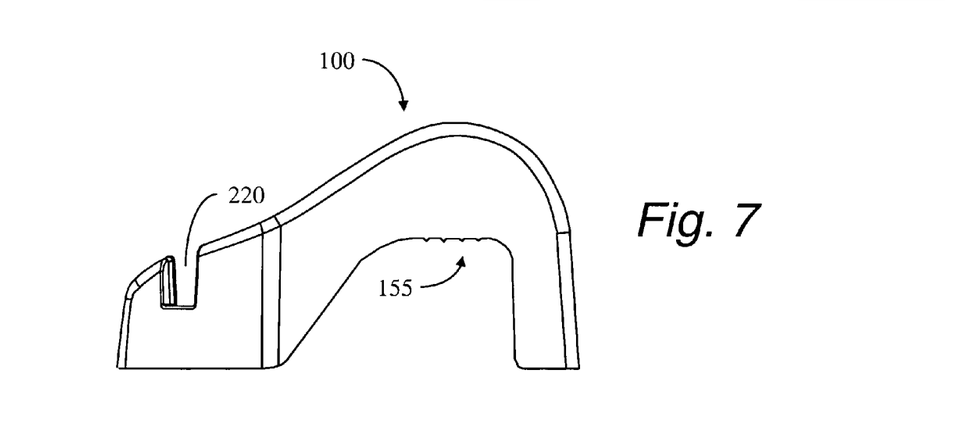
FIG. 7 is a second side elevation view of the console storage housing.

Side elevation views of the console storage housing 100 are illustrated in FIGS. 6 and 7. The cutouts 220, providing space for mug handles 180, are clearly shown. The shaped cutout 155 for mounting to the automobile's interior structure, is also seen.

Figures 8, 9, 10:
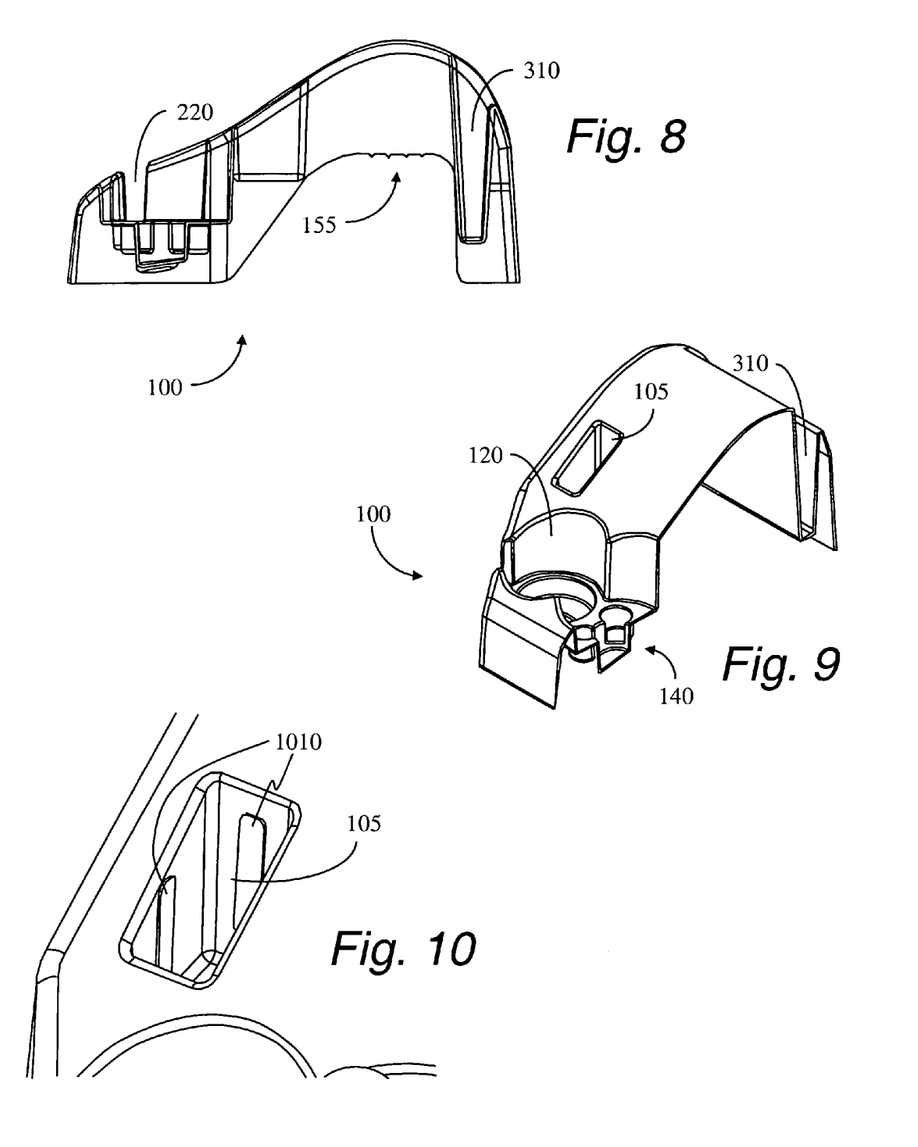
FIG. 8 is a horizontal half section view of the console storage housing depicting the underside shell surfaces for mounting to the internal structure of the automobile.
FIG. 9 is a perspective, cutaway view of the console storage housing.
FIG. 10 is a perspective view of a left portion of the console storage housing depicting installed rectangular pads inside a first compartment.

FIG. 8 is a sectional view taken through a vertical center plane of the console storage housing 100. Here, we see the curved surfaces of the one-piece housing. Also shown are the cross sections of the beverage cup holder 121, the specialized coin compartments 140, and the map pocket 310. The shaped cut out 155 is shown in detail, depicting the profile that matches the automobile's interior structure for mounting.

FIG. 9 depicts an isometric right cross sectional view taken through the vertical center plane of the console storage housing 100. The general shape of the one piece curved housing is seen. Also shown again are the openings for storage 105, 120, 121, and 140. A cross sectional profile of the map pocket 310 opening is shown.

FIG. 10 shows a first front corner of the console storage housing 100 depicting the installation of essentially rectangular, flexible pads 1010 within the storage compartment 105 of the console storage housing 100. These pads 1010 can be installed in any storage opening to reduce the size of the opening for a snugger fit of stored items. These pads 1010 can also prevent vibration and rattling of stored items.

Figures 11, 12A, 12B, 13:
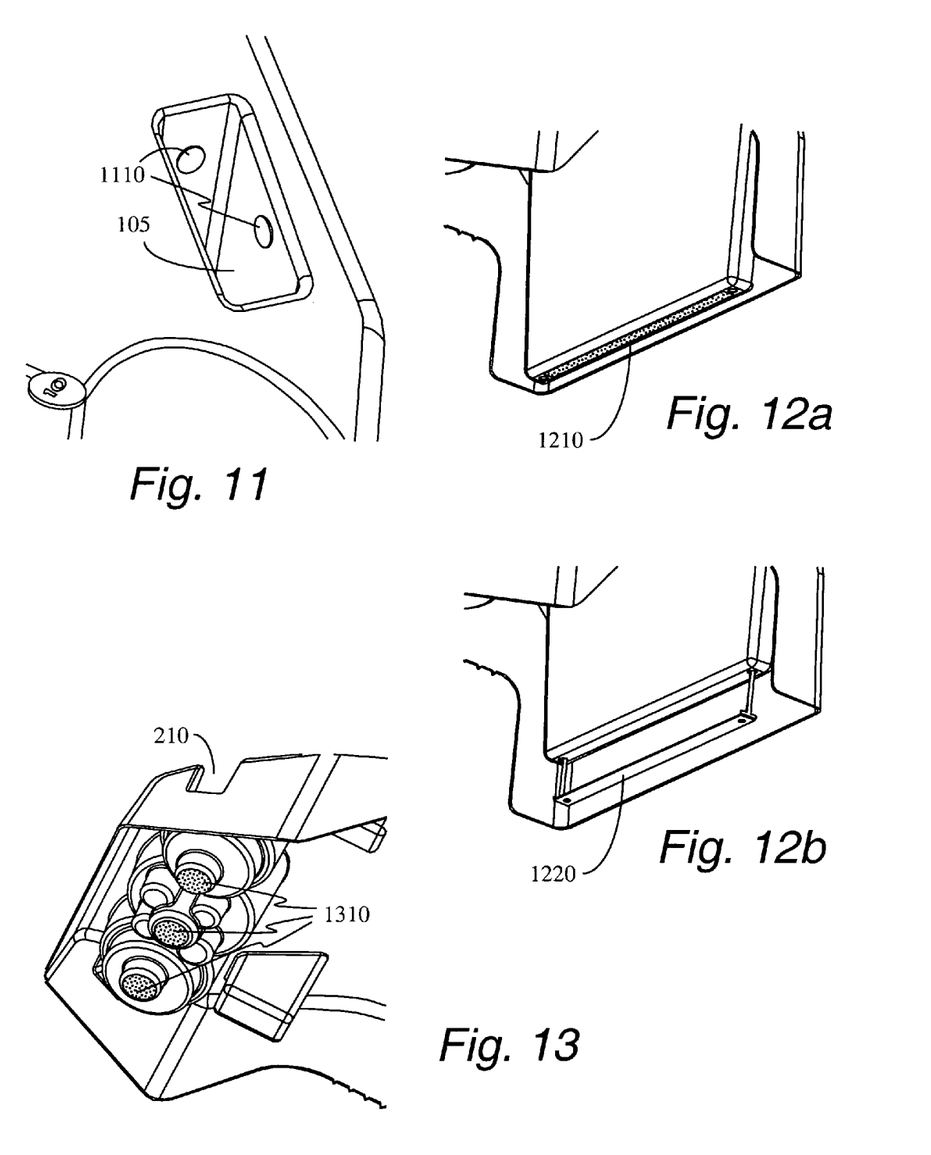
FIG. 11 is a perspective view of the right portion of the console storage housing depicting installed circular pads inside a second compartment.
FIG. 12a is a perspective view of a first embodiment an underside, rear portion of the console storage housing.
FIG. 12b is a perspective view of a second embodiment an underside, rear portion of the console storage housing.
FIG. 13 is a perspective view of an underside, front portion of the console storage housing.

FIG. 11 shows a second front corner of the console storage housing 100 depicting the installation of circular pads 1110 within storage opening 2 of the housing 1. These pads can be installed as shown or in any other storage opening to reduce the size of the opening for tighter fit of stored items. These pads can also prevent vibration and rattling of stored items.

The rear, underside of the console storage housing 100 is illustrated in FIGS. 12a and 12b. A first embodiment, featuring a mounting surface for a hook and loop fastener strip 1210 for mounting the console storage housing 100 to the automobile interior is shown in FIG. 12a. The hook and loop strip 1210 mounts to the bottom of the map pocket 310 and attaches to the automobile's cargo area. FIG. 12b shows a separate sheet metal fastening strip 1220 that may be pushed up through the underside of the automobile's carpet and into the bottom of the map pocket 310. Tabs, associated with the fastening strip 1220, are bent over to hold the back of the console storage housing 100 securely in place.

FIG. 13 shows the underside mounting components for the front of the console storage housing 100. Depicted are self-adhesive circular pads 1310 installed to bottom surfaces of the console. These circular pads 1310 adhere to the automobile's existing console surface.

Figure 14:
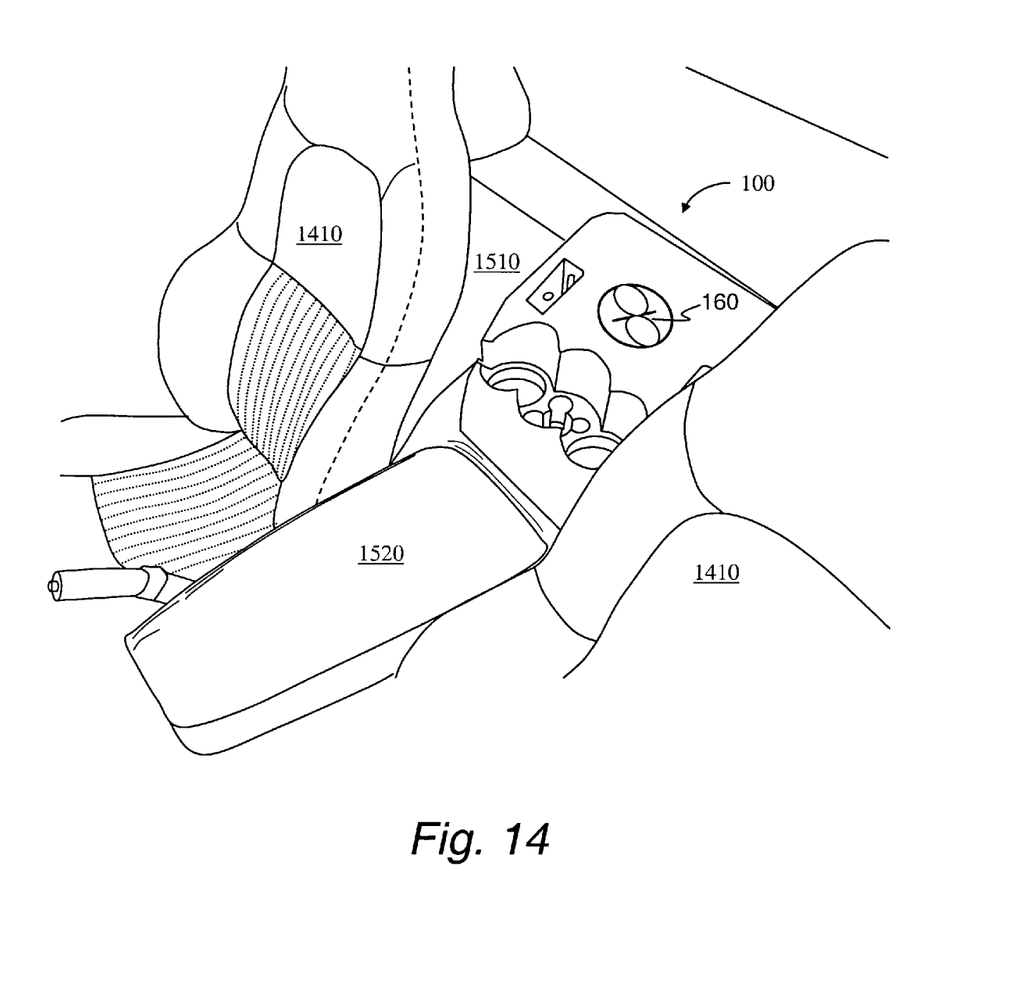
FIG. 14 is a first perspective view of the console storage housing from a driver's side window, installed in an automobile.

A view generally from the driver's-side window of the console storage housing 100 in place between the seats 1410 is shown in FIG. 14. It should be noted that the surface finish and color of the console storage housing 100 matches or complements the interior surfaces and color(s) of the automobile in which it is placed, thereby enhancing storage capacity while not detracting from the aesthetics of the interior.

Figure 15:
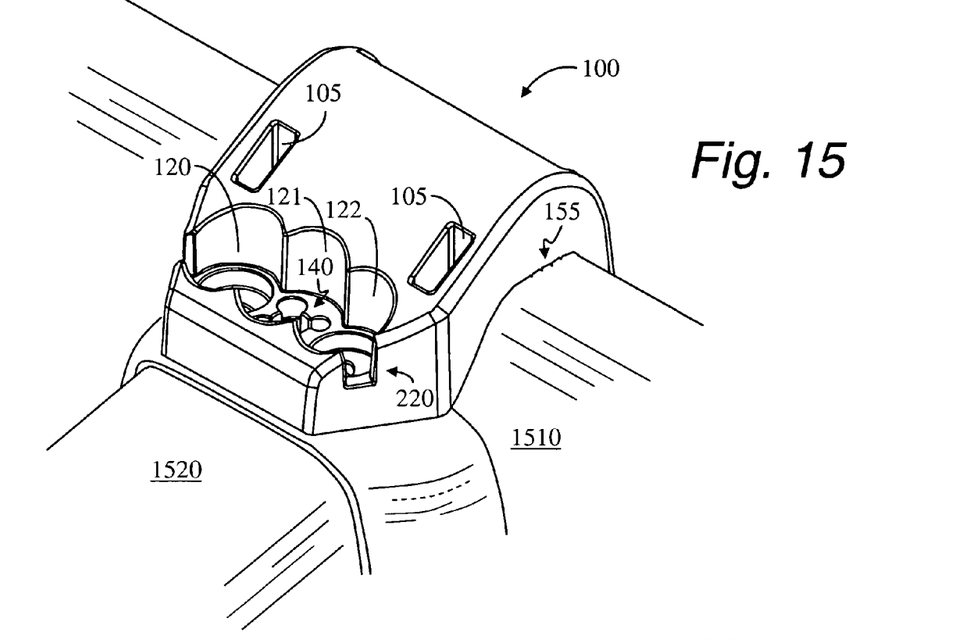
FIG. 15 is a second perspective view of the console storage housing from the front installed in an automobile.
Figure 16:
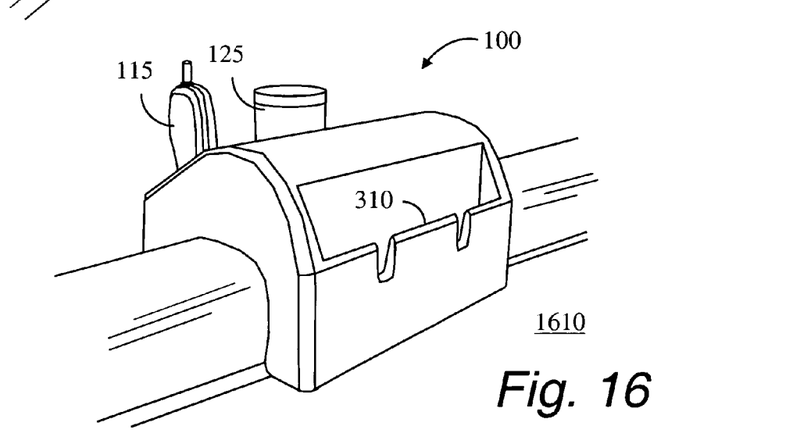
FIG. 16 is a perspective view of the console storage housing from the rear installed in an automobile.

FIGS. 15 and 16 show the console storage housing 100 installed in an automobile. The automobile's structural bulkhead 1510, existing console 1520 and rear cargo area 1610 are clearly seen in these views.

Obviously, many modifications and variations of the invention are possible in light of the above teachings. Therefore, it is to be understood that within the scope of the appended claims the invention may be practiced otherwise than as specifically described.

What is claimed is:

1. A console storage housing for use in an automobile, said automobile comprising, an interior, an existing center console, a back cargo area, and a structural bulkhead, said console storage housing comprising:
 (a) a console storage housing rear underside area shaped to mount over an angularly positioned portion of the structural bulkhead;
 (b) a console storage housing forward underside area shaped to mount over the existing center console;
 (c) the console storage housing rear underside area shaped to mount to a surface of the automobile's back cargo area;
 (d) a cup holder;
 (e) a plurality of coin compartments for storage of various sized coins, said coin compartments disposed at a bottom of the cup holder; and
 (f) wherein said coin compartments are disposed around a periphery of the cup holder and have an opening from the cup holder in each respective one of the coin compartments, said opening being from top to bottom of each respective one of the coin holders whereby a person can use a finger disposed in the cup holder to remove coins from each respective coin holder.

* * * * *